United States Patent [19]

Justesen

[11] Patent Number: 5,025,548
[45] Date of Patent: Jun. 25, 1991

[54] RIGHT-ANGLE DRIVE FOR VERTICAL MILLING MACHINE

[76] Inventor: Scott F. Justesen, 9710 223rd. St. North, Forest Lake, Minn. 55025

[21] Appl. No.: 538,746

[22] Filed: Jun. 15, 1990

[51] Int. Cl.⁵ .......................................... B23Q 37/00
[52] U.S. Cl. ..................................... 29/560; 408/20; 408/135; 409/144; 409/230; 409/215
[58] Field of Search ................ 409/144, 215, 230; 408/135, 136, 20; 29/560

[56] References Cited

U.S. PATENT DOCUMENTS

| | | |
|---|---|---|
| 1,029,402 | 6/1912 | Ritter . |
| 1,397,696 | 11/1921 | Nelson .............................. 409/144 |
| 1,720,712 | 7/1929 | Armitage ........................... 409/144 |
| 1,976,107 | 10/1934 | Archea .............................. 409/215 |
| 1,989,007 | 1/1935 | Gorton .............................. 409/215 |
| 2,669,162 | 2/1954 | Arliss . |
| 3,096,687 | 7/1963 | Klopp et al. ..................... 409/215 |
| 3,163,081 | 12/1964 | Vickers . |
| 3,387,638 | 6/1968 | West . |
| 3,407,704 | 10/1968 | Reeber et al. ..................... 409/215 |
| 4,627,773 | 12/1986 | Ehnert ............................... 409/215 |
| 4,638,550 | 1/1987 | Malzkorn . |
| 4,671,712 | 6/1987 | Sellner et al. . |
| 4,815,347 | 3/1989 | Rogers . |

FOREIGN PATENT DOCUMENTS 688407  4/1930  France ............................... 408/135

Primary Examiner—Daniel W. Howell
Attorney, Agent, or Firm—Jacobson and Johnson

[57] ABSTRACT

A right-angle drive for a vertical milling machine to enable an operator to perform delicate horizontal work including a housing for attachment to a vertical milling machine with the housing including a horizontally displaceable rotating drive shaft to permit horizontal movement of the drive shaft instead of the bed of the milling machine during horizontal machining operations on the vertical milling machine.

6 Claims, 5 Drawing Sheets

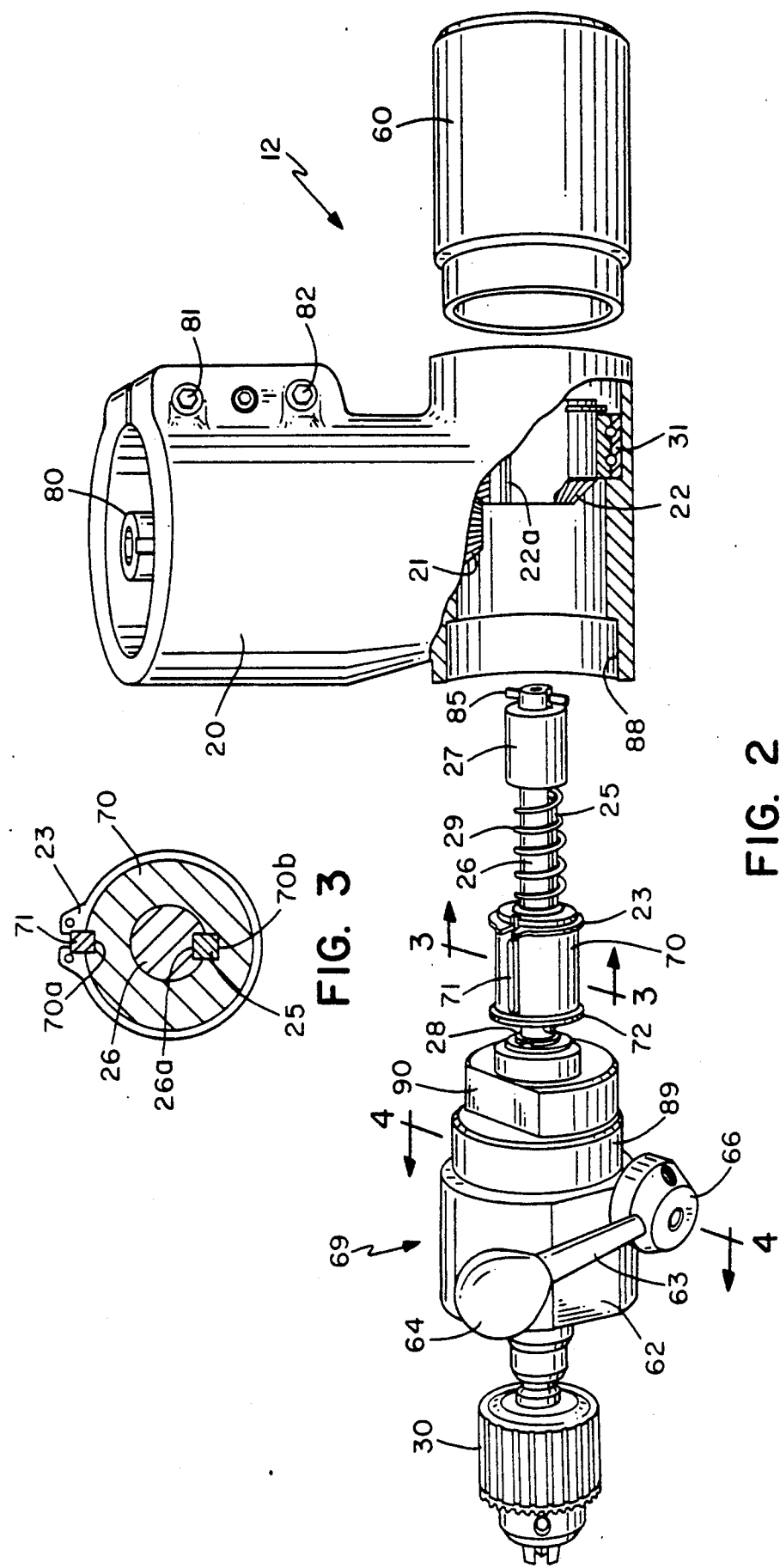

RIGHT-ANGLE DRIVE FOR VERTICAL MILLING MACHINE

This invention relates generally to right-angle drives for vertical milling machines, and more specifically, to a feel-sensitive right-angle drive for a vertical milling machine that permits an operator to carefully control the horizontal displacement of a work tool attached to a right-angle adaptor.

BACKGROUND OF THE INVENTION

Vertical milling machines are well known in the art; their use is for vertical milling of a part held on a horizontal bed. To increase the flexibility of the milling machine, an operator connects a right angle adaptor to the head of the milling machine to permit an operator to mill or drill horizontally. To drill horizontally, an operator working on a piece places it on the conventional milling machine bed which he or she can then move horizontally or vertically. To drill into an article, an operator moves the bed containing the work piece into the horizontally rotating drill. One of the disadvantages of using right-angle adaptors to is that an operator must move the entire bed and the work piece into the rotating drill. The disadvantage of moving the bed is that, because the bed is massive and moves through a set of reduction gears, an operator oftentimes loses the feel of moving the bed and thus has difficulty in the moving the bed delicately and precisely; consequently, an operator may break the drill bit in the work piece.

It would be advantageous if an operator could drill holes in a work piece on the bed of a vertical milling machine with the feel-sensitive movement typically used to drill holes in a drill press. In addition, tapping a hole with conventional right angle adaptors is virtually impossible because an operator can not precisely move the bed into a tap located in the right-angle adaptor of the milling machine. A horizontally displaceable bed also limits an operator to drilling holes parallel to the horizontal displacement axis of the work bed.

The present invention eliminates the necessity of moving the part into the rotating tool because it provides a movable chuck, thus giving an operator a feel-sensitive horizontally movable chuck which he or she can precisely move into the work piece.

A further advantage is that an operator can now drill and tap horizontally at angles other than those parallel to the motion of the bed of the milling machine. In addition, because the drive shaft is horizontally displaceable, the operator can use my invention to tap holes in work pieces located on the bed.

DESCRIPTION OF THE PRIOR ART

U.S. Pat. No. 3,387,638 shows a multi-purpose shop tool that can be adapted for a number of different operations, such as sawing, drilling, boring, shaping, blade work and sanding.

U.S. Pat. No. 1,029,402 shows a milling attachment for a drill press to permit an operator to mill horizontally.

U.S. Pat. No. 3,163,081 shows a right-angle milling head for mounting on a drilling machine or the like.

U.S. Pat. No. 4,638,550 shows a horizontal drilling and milling machine with a pivotable work head that an operator can rotate from the horizontal to the vertical position.

U.S. Pat. No. 2,669,162 shows a right-angle adaptor for drill presses which permits a user to rotate a horizontal shaft holding a cutting tool.

U.S. Pat. No. 4,671,712 shows a cross slide for a lathe that increases the range of operations from which an operator can machine a work piece.

U.S. Pat. No. 4,815,347 shows a lathe attachment with a non-rotating axially movable chuck. The unit, which does not rotate, is mounted in the tail stock of the lathe, and an operator can horizontally displace the rack and chuck into the work piece.

BRIEF SUMMARY OF THE INVENTION

Briefly, the invention comprises a right-angle adaptor to a vertical milling machine, having a horizontally rotating drive shaft that is horizontally displaceable to allow an operator to delicately move a horizontally rotating tool into a work piece or allow a work piece to pull the rotating drive shaft into the work piece.

BRIEF DESCRIPTION OF THE DRAWING

FIG. 2 is a partially exploded view of my invention;

FIG. 3 shows a sectional view taken along lines 3—3 of FIG. 2;

DESCRIPTION OF THE PREFERRED EMBODIMENT

Figure 1:
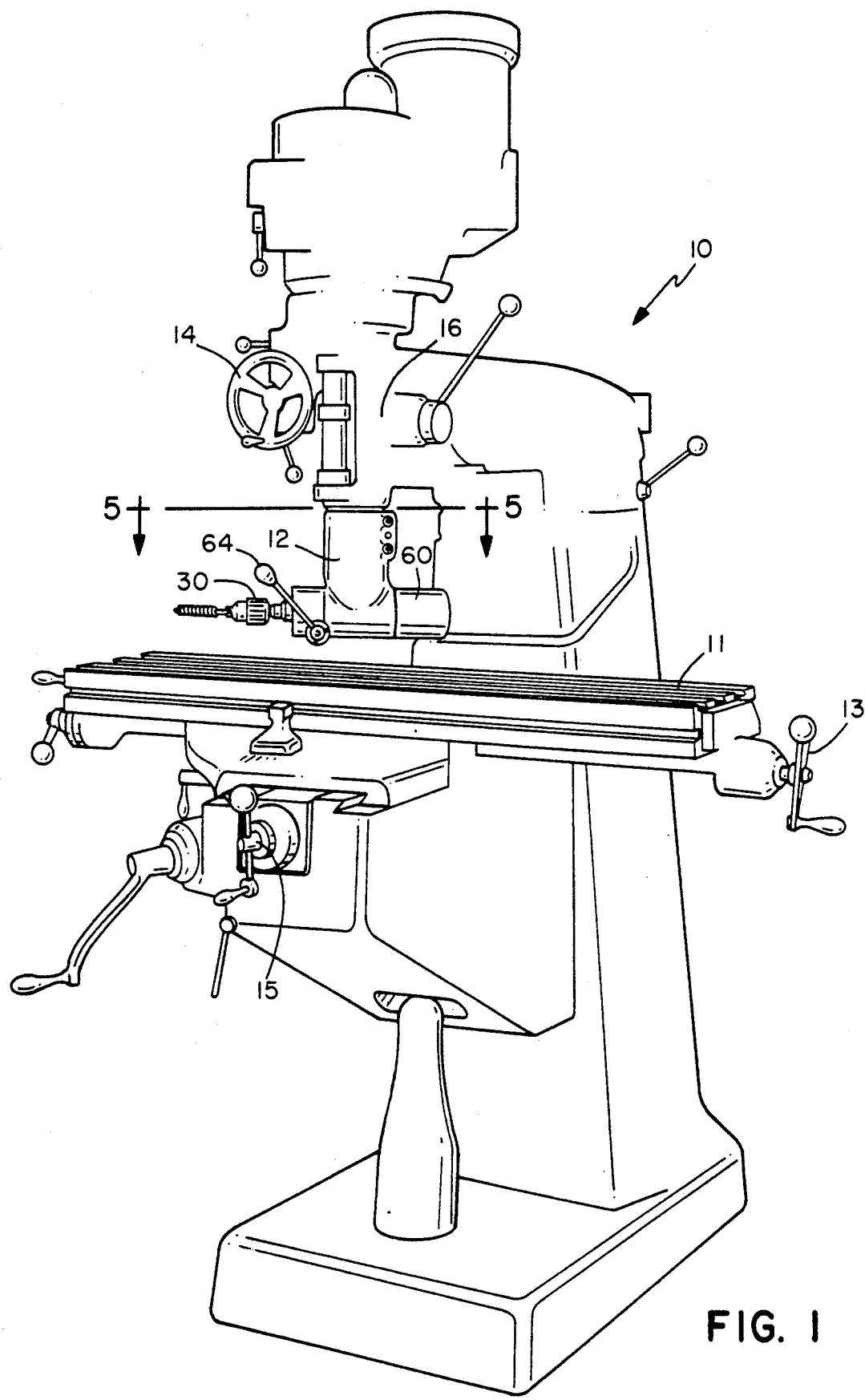
FIG. 1 shows a perspective view of a vertical milling machine with my right-angle feel-sensitive adaptor mounted thereon.

FIG. 1 reference numeral 10 generally identifies a vertical milling machine 10 having a horizontal bed 11 for holding a work piece. A gear mechanism connected to handle 13 permits an operator to move horizontal bed 11 horizontally. My invention comprises right-angle attachment 12 which connects to the work head 16 of vertical milling machine 10. A lower-gear mechanism connected to handle 15 permits an operator to move bed 11 in and out in the milling machine 10.

FIG. 2 shows an exploded view of my right-angle attachment 12 having an external housing 20 for mounting to milling machine 10. Bolts 81 and 82 permit an operator to clamp housing 20 around a cylindrical extension on a vertical milling machine. Right-angle attachment 12 comprises a vertical drive shaft 80, which has one end that connects to a drive shaft of a vertical milling machine. The other end of drive shaft 80 connects to a bevel gear 21 which rotates an annular bevel gear 22 that is rotationally mounted on a horizontal axis within a bearing 31. Located on the interior surface of annular bevel gear 22 is an axial extending slot or channel 22a for engaging a drive key 71; that is, an annular drive collar 70 fits within the central opening in annular bevel gear 22 so that drive key 71 engages slot 22a to provide rotational motion to annular drive collar 70 as the machine rotates annular bevel gear 22.

FIG. 3 shows a cross-sectional view illustrating drive key 71 located in a drive slot 70a in annular drive collar 70. Located on one end of annular drive collar 70 is a first slip ring 72, and located on the opposite end of annular drive collar 70 is a second slip ring 23. When annular drive collar 70 is located in annular bevel gear, slip ring 72 extends on one side of annular bevel gear 22, and a second slip ring 23 extends on the opposite side of annular bevel gear 22 to hold annular drive collar 70 within the confines of annular bevel gear 22. During operation of my invention, annular bevel gear 22 rotates annular drive collar 70 about a horizontal axis extending through annular drive collar 70.

Located in an axially slideable relationship in annular drive collar 70 is a drive shaft spindle 26. Annular drive collar 70 rotates drive shaft spindle 26 through a drive key 25.

FIG. 3 is a cross-sectional through annular drive collar 70, revealing drive shaft 26 and a drive key 25 which partially fits into a rectangular slot or channel 26a in drive shaft 26 and a rectangular slot or channel 70b in drive collar 70. On one end of drive shaft spindle 26 is a collar 27 and a compression spring 29. A pin 85 extends through an opening in the end of drive shaft spindle 26 to hold collar 27 and spring 29 on drive shaft spindle 26. Spring 29 provides a biasing force that normally holds annular drive collar 70 in the left end of drive shaft spindle 26, as shown in FIG. 2.

Connected to drive shaft spindle 26 is a work head 69. Work head 69 comprises a housing 62 having a cylindrical surface 89 which forms a smooth frictional fit with an annular opening 88 in housing 20. On top of work head 69 is a flat surface 90 which provides clearance between bevel gear 21 and work head 69. Extending outward from the side of work head 69 is a hand lever 63 with a knob 64 which permits an operator to move a chuck 30 horizontally.

Located on the back end of right angle drive 12 is a cylindrical cap that fits into a cylindrical opening located on the back of housing 20.

Figure 4:
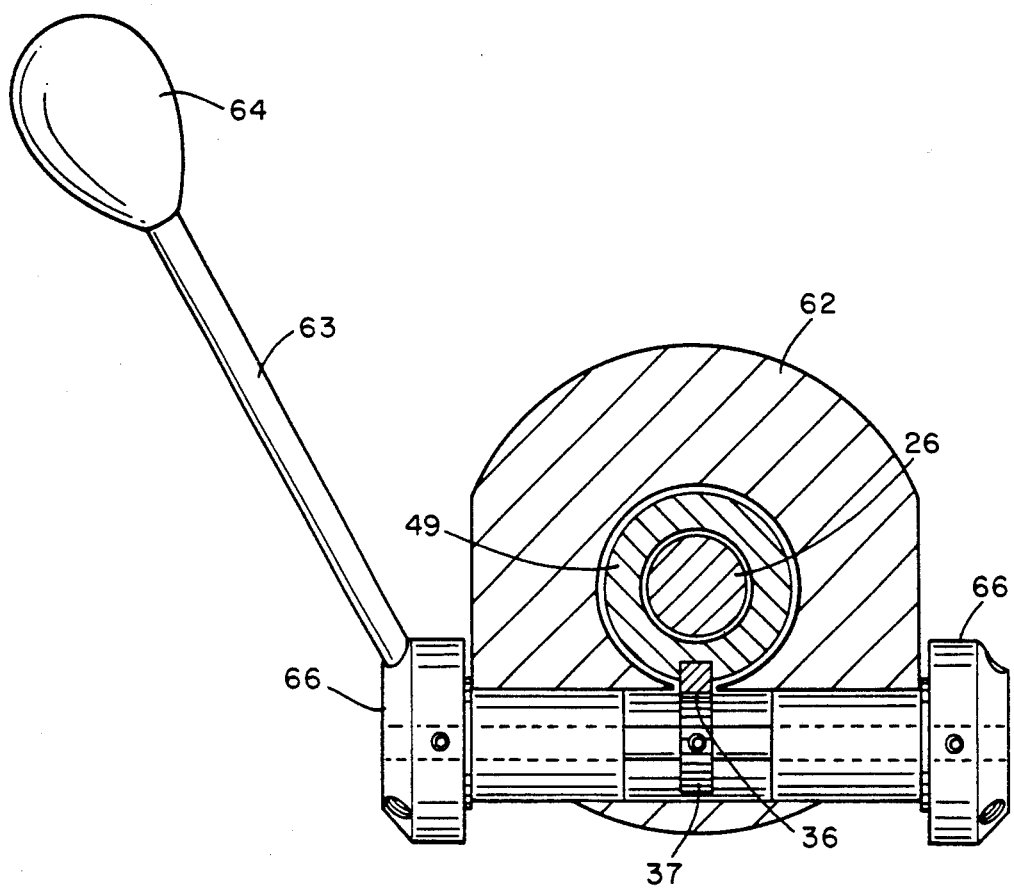
FIG. 4 is a sectional view taken along lines 4—4 of FIG. 2.
Figure 6:
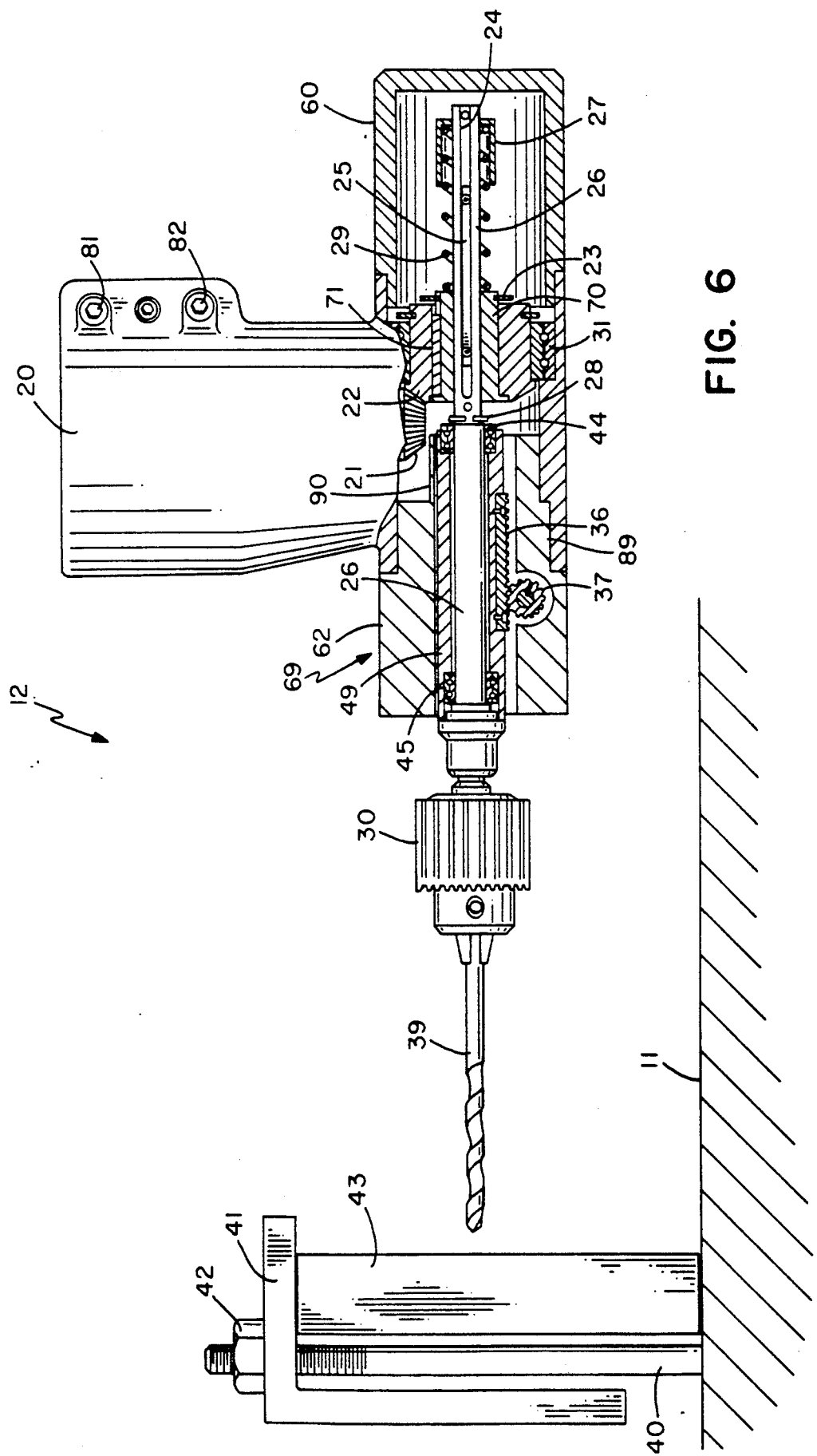
FIG. 6 shows the horizontal drive spindle of my adaptor about to engage a work piece.

To understand the horizontal displacement action of drive shaft spindle 26, refer to FIGS. 4 and 6. FIG. 4 shows a hand lever 63 with a knob 64. Hand lever 63 connects to a transverse rotationally mounted shaft 66. Shaft 66 includes a pinion gear 37 which drives a rack gear 36 axially mounted on collar housing 49. Housing 49 is located around one end of drive shaft spindle 26 and permits horizontal displacement of drive shaft spindle 26. FIG. 6 shows pinion gear 37 engaging rack gear 36 to permit an operator to axially slide rotating drive shaft spindle 26 within work head 69.

Figure 5:
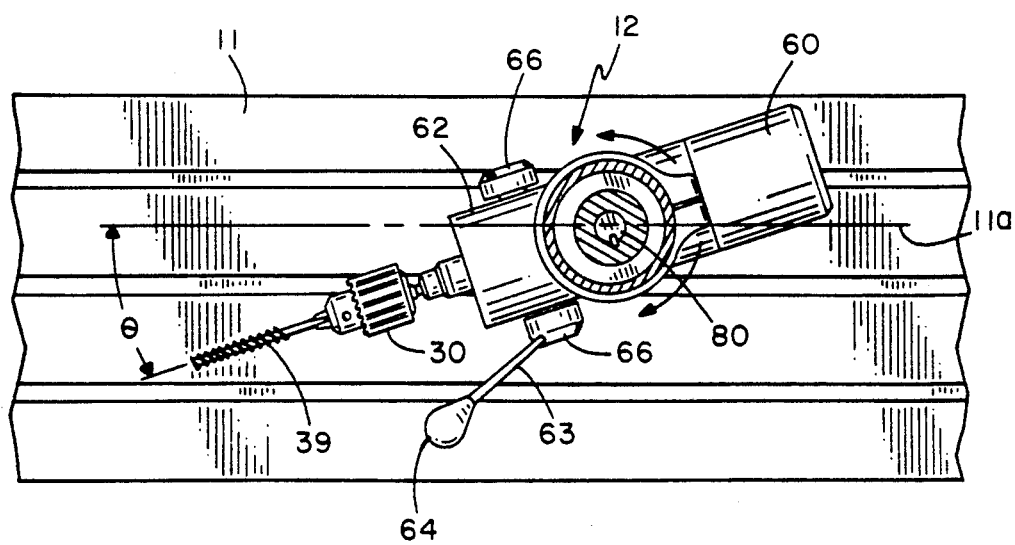
FIG. 5 shows a top view of my invention located over the bed of a vertical milling machine.

FIG. 5 shows an overhead sectional view of my right-angle adaptor 12 mounted at an angle with respect to bed 11 of the milling machine. Mounted at an angle theta with respect to the horizontal displacement axis 11a are chuck 30 and a drill bit 39. With the present invention, an operator can drill a hole in a work piece with the hole located at an angle with respect to the horizontal displacement axis 11a of bed 11. To illustrate the drilling of a horizontal hole in a work piece, refer to FIGS. 6 and 7.

FIG. 6 is a cross-sectional view of my invention in the retracted position. Note that bevel gear 21 rotates annular bevel gear 22 which, in turn, rotates drive shaft spindle 26 through drive key 25. Drive shaft spindle 26 extends through work head 62 and connects to chuck 30 holding drill bit 39 in position for forming a horizontal hole in a work piece 43. An L-shaped bracket 41, a bolt 40 and a nut 42 hold L-shaped bracket 41 and work piece 43 on bed 11.

Figure 7:
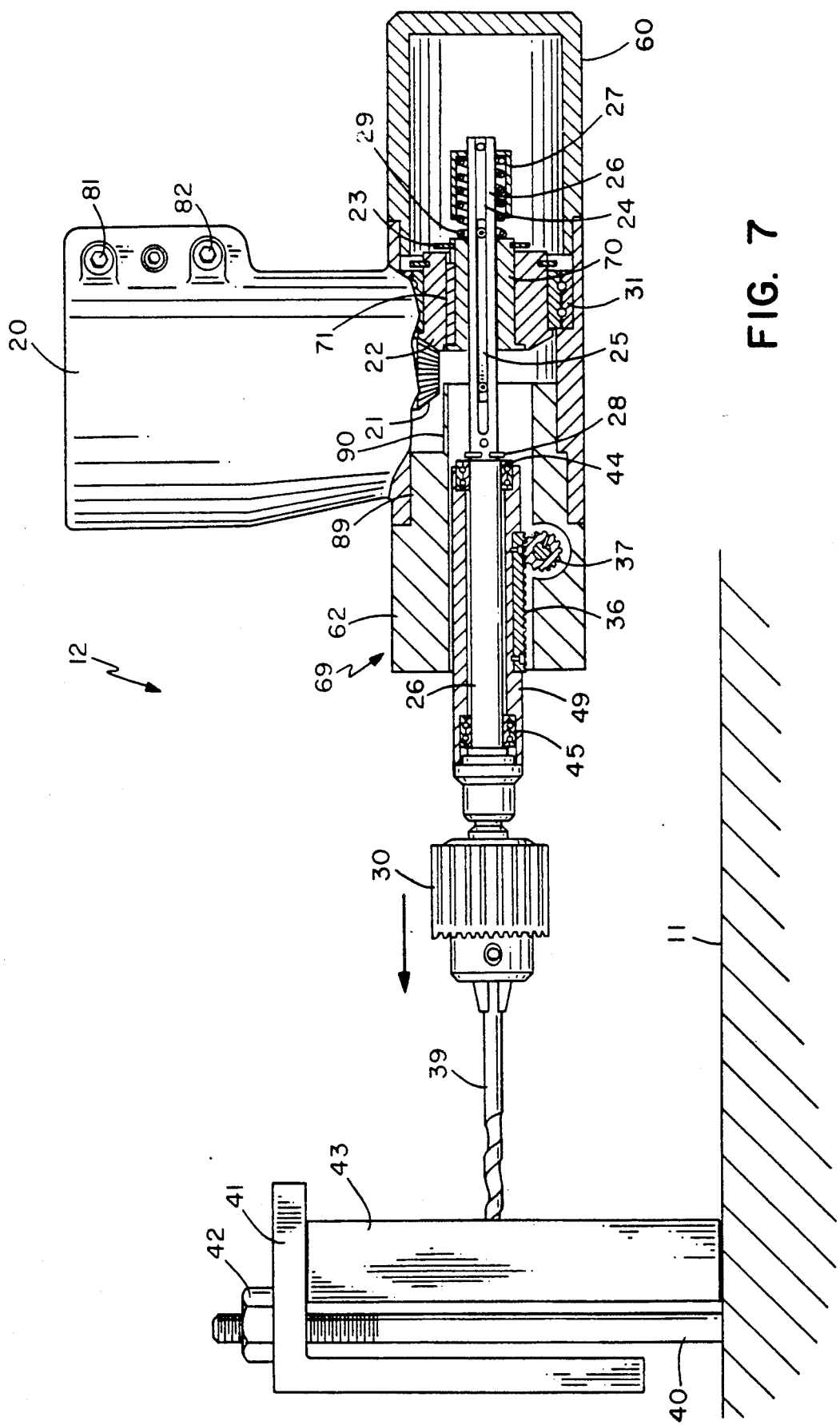
FIG. 7 shows my horizontal drive spindle extended horizontally outward to drill a hole in a work piece.

FIGS. 6 and 7 reveal that rack 36 and pinion gear 37 permit an operator to horizontally displace rotatable drive shaft 26. A bearing 44 and a bearing 45 on each end of an annular housing 35 provide rotational freedom of annular drive shaft spindle 26. A non-rotatable, but horizontally displaceable, housing 49 located outside drive shaft spindle 26 permits an operator to move housing 49 horizontally inward and outward.

FIG. 7 illustrates displacement of chuck 30 and drill 39 into work piece 43 by the horizontal extension of drive shaft spindle 26. Note the position of pinion gear 37 with respect to rack 36. As an operator moves housing 49 inward and outward, milling machine 10 transmits power continually through gear 21, annular drive gear 22, drive key 25, and into drive shaft spindle 26. The housing 49 supports the end of drive shaft spindle 26 and moves in and out through the rack and pinion mechanisms 36 and 37. An advantage of my invention is that an operator has much more control of the movement of the drill 39 into the work piece. For example, with small drills, an operator can control the pressure which prevents the unit from breaking the drill bit. In addition, if an operator wants to tap a hole in a work article, he or she can use my chuck 30 to tap a hole since the slideable collar housing permits the chuck with the tap to move into the work piece as the hole is being tapped.

I claim:

1. A right-angle drive for a vertical milling machine to enable an operator to perform delicate horizontal boring operations comprising:

a housing for attachment to a vertical milling machine;

a vertical drive shaft located in said housing, said drive shaft including a bevel gear;

a first annular drive collar rotationally mounted along an horizontal axis in said housing, said first annular drive collar rotatably driven by said bevel gear, said first annular drive collar including an axial slot for engaging a drive key;

a horizontally rotatable drive shaft spindle having, a central axis, a first end, an intermediate portion and a second end, said horizontally rotatable drive shaft spindle including an axial slot;

a second annular drive collar, said second annular drive collar located in axially slideable relationship on said intermediate portion of said drive shaft spindle, said second annular drive collar including a first axial slot and a second axial slot;

a first drive key extending partially into said axial slot on said first annular drive collar and into said first axial slot on said second annular drive collar to thereby cause said first annular drive collar and said second annular drive collar to rotate together;

a non-rotatable horizontally displaceable housing located in said housing, said horizontally rotatable drive shaft spindle rotatably mounted in said non-rotatable horizontally displaceable housing;

a second drive key mounted on said horizontally rotatable drive shaft spindle, said second drive key extending partially into said second axial slot, said second drive key slideably mounted in said second axial slot to permit axial displacement of said horizontally rotatable drive shaft spindle in said second annular drive while rotating said horizontally rotatable drive shaft spindle;

a rack gear mounted on said non-rotatable horizontally displaceable housing;

a pinion gear rotatably mounted in said housing engagement with said rack gear to permit an operator to horizontally move said horizontally rotatable drive shaft spindle; and a chuck for holding a work tool located on said first end of said horizontally rotatable drive shaft spindle so that an operator can horizontally move said chuck with a work tool to permit him or her to delicately control the horizontal displacement of the chuck with said work tool to prevent breaking of said work tool.

2. The right-angle drive for a vertical milling machine of claim 1 including a return spring for biasing said work tool toward a first horizontal position.

3. The right-angle drive for a vertical milling machine of claim 2, wherein said housing comprises a split housing and fastening means to permit an operator to angularly position said housing on a vertical milling machine.

4. The right-angle drive for a vertical milling machine of claim 3 including a vertical milling machine having a horizontal displaceable bed for holding a work piece.

5. A right-angle drive for a vertical milling machine to enable the operator to perform delicate horizontal work operations comprising:

a housing for attachment to a vertical milling machine;

a vertical drive shaft located in said housing;

a drive member rotationally mounted along an horizontal axis in said housing, said drive member rotatably driven by said vertical drive shaft gear;

a horizontally displaceable drive shaft having, a central axis a first end, an intermediate portion and a second end, said horizontally displaceable drive shaft rotatably mounted in said housing;

feel sensitive means mounted in said housing to permit horizontal displacement of said horizontally rotatable drive shaft with respect to said housing, said feel sensitive means including means for providing a return force to said horizontal drive shaft and a rack gear connected to said horizontally displaceable drive shaft and a pinion gear for engaging said rack gear, said rack gear operable for rotation by user to permit the user to advance said horizontally displaceable drive shaft by rotating said pinion gear.

6. The right-angle drive of claim 5 wherein said mean for providing a return force to said horizontal drive shaft comprises a spring.

* * * * *